(12) United States Patent
Myoung

(10) Patent No.: US 8,956,138 B2
(45) Date of Patent: Feb. 17, 2015

(54) COOKIE DECORATING TOOL

(71) Applicant: Progressive International Corporation, Kent, WA (US)

(72) Inventor: Sul Gi Myoung, Federal Way, WA (US)

(73) Assignee: Progressive International Corporation, Kent, WA (US)

( * ) Notice: Subject to any disclaimer, the term of this patent is extended or adjusted under 35 U.S.C. 154(b) by 0 days.

(21) Appl. No.: 13/939,536

(22) Filed: Jul. 11, 2013

(65) Prior Publication Data

US 2014/0017350 A1     Jan. 16, 2014

Related U.S. Application Data

(60) Provisional application No. 61/671,500, filed on Jul. 13, 2012.

(51) Int. Cl.
*A21C 11/00*     (2006.01)
*A21C 11/12*     (2006.01)

(52) U.S. Cl.
CPC ............... *A21C 11/00* (2013.01); *A21C 11/12* (2013.01)
USPC ........... 425/193; 425/196; 425/383; 425/385

(58) Field of Classification Search
CPC .................................. A21C 11/00; A21C 11/10
USPC ............. 425/183, 193, 196, 363, 385, 192 R
See application file for complete search history.

(56) References Cited

U.S. PATENT DOCUMENTS

| | | | | | |
|---|---|---|---|---|---|
| 1,598,717 | A | * | 9/1926 | Harding | 30/301 |
| 2,075,157 | A | * | 3/1937 | Alberti | 7/111 |
| 3,111,914 | A | * | 11/1963 | Viviano | 425/289 |
| 3,279,397 | A | * | 10/1966 | Swett et al. | 425/298 |
| 4,671,759 | A | * | 6/1987 | Hayashi et al. | 425/294 |
| D312,194 | S | * | 11/1990 | McMiller | D7/682 |
| 6,851,192 | B2 | * | 2/2005 | So | 30/306 |
| 7,252,491 | B2 | * | 8/2007 | Errera | 425/96 |
| 7,914,834 | B2 | * | 3/2011 | Fu et al. | 426/503 |
| 8,303,294 | B2 | * | 11/2012 | Qureshi et al. | 425/363 |
| 2004/0109911 | A1 | * | 6/2004 | Boegli | 425/363 |
| 2005/0076516 | A1 | * | 4/2005 | Groll et al. | 30/315 |
| 2005/0153023 | A1 | * | 7/2005 | Overton | 426/94 |
| 2005/0280182 | A1 | * | 12/2005 | Boegli | 264/284 |
| 2006/0210672 | A1 | * | 9/2006 | Suttle et al. | 426/89 |
| 2007/0065528 | A1 | * | 3/2007 | Hernandez | 425/9 |
| 2010/0212162 | A1 | * | 8/2010 | Ronan | 30/122 |
| 2012/0177768 | A1 | * | 7/2012 | Johnson | 425/363 |
| 2012/0292821 | A1 | * | 11/2012 | Boegli | 264/293 |
| 2013/0069276 | A1 | * | 3/2013 | Boegli | 264/293 |
| 2014/0186480 | A1 | * | 7/2014 | Hsu | 425/363 |

* cited by examiner

*Primary Examiner* — Joseph S. Del Sole
*Assistant Examiner* — Nahida Sultana
(74) *Attorney, Agent, or Firm* — Lowe Graham Jones PLLC

(57) ABSTRACT

A cookie decorating tool includes a main body having attachment points for a plurality of decorating tool heads. In one version, the tool heads are in the form of one or more interchangeable stamps or rollers, each having a different design that may be imparted onto cookie dough to leave an impression prior to baking.

8 Claims, 5 Drawing Sheets

COOKIE DECORATING TOOL

PRIORITY CLAIM

This application claims the benefit of prior U.S. provisional application Ser. No. 61/671,500 filed Jul. 13, 2012, the contents of which are incorporated by reference.

FIELD OF THE INVENTION

This invention relates to tools for pressing designs into cookie dough.

BACKGROUND OF THE INVENTION

Cooks often use stamps of one form or another to impart shapes into cookie dough. Current stamps, however, are difficult to grip and are designed so that a single tool provides only a single stamp design. Stamping tool heads are not readily interchangeable or replaceable, making it expensive and inconvenient to use stamps to press designs into dough.

SUMMARY OF THE INVENTION

A cookie decorating tool includes a main body having attachment points for a plurality of decorating tool heads.

In one version, the tool heads are in the form of one or more interchangeable stamps or rollers, each having a different design that may be imparted onto cookie dough to leave an impression prior to baking.

In preferred examples of the invention, a main body is configured to receive three separate tool heads, any one of which may be removed and replaced with different tool heads.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
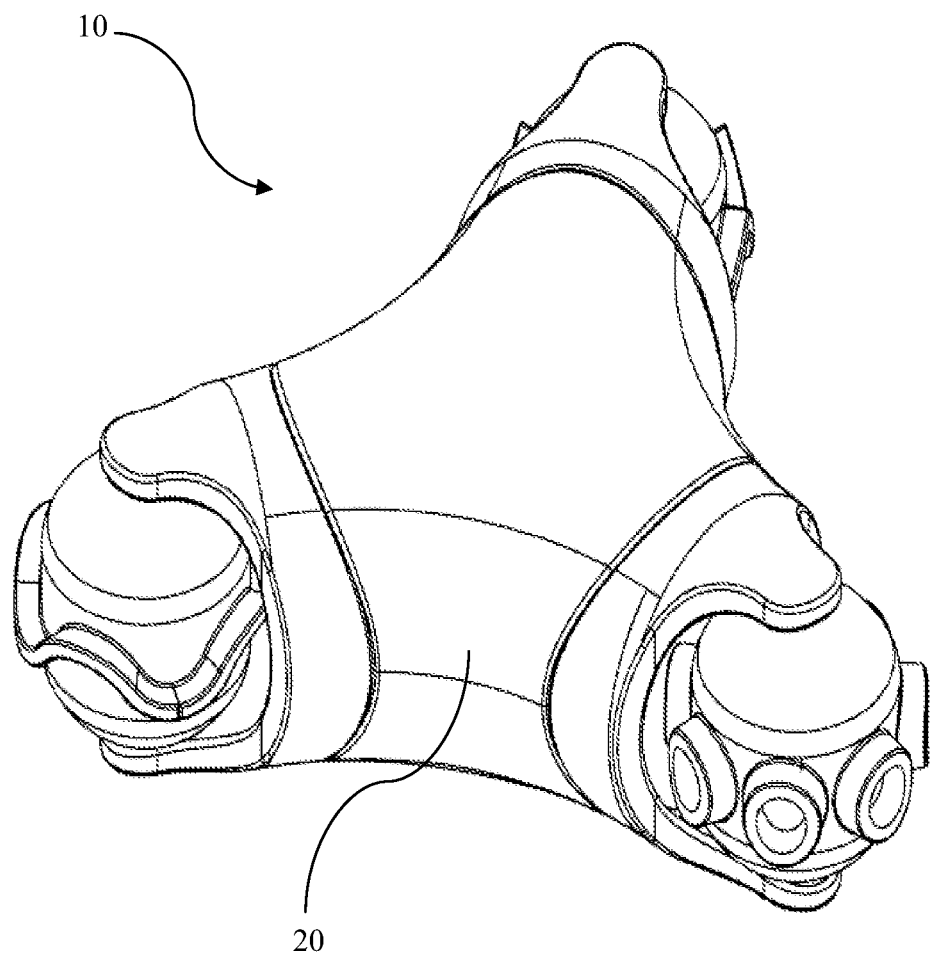
FIG. 1 is a perspective view of a preferred example of a cookie decorating tool, configured with three stamp roller tool heads.

As illustrated in FIG. 1, a preferred cookie decorating tool 10 in accordance with the invention includes a main body 20 having attachment points for a plurality of decorating tool heads. In one version, the tool heads are in the form of one or more interchangeable stamps or rollers, each having a different design that may be imparted onto cookie dough to leave an impression prior to baking.

Figure 2:
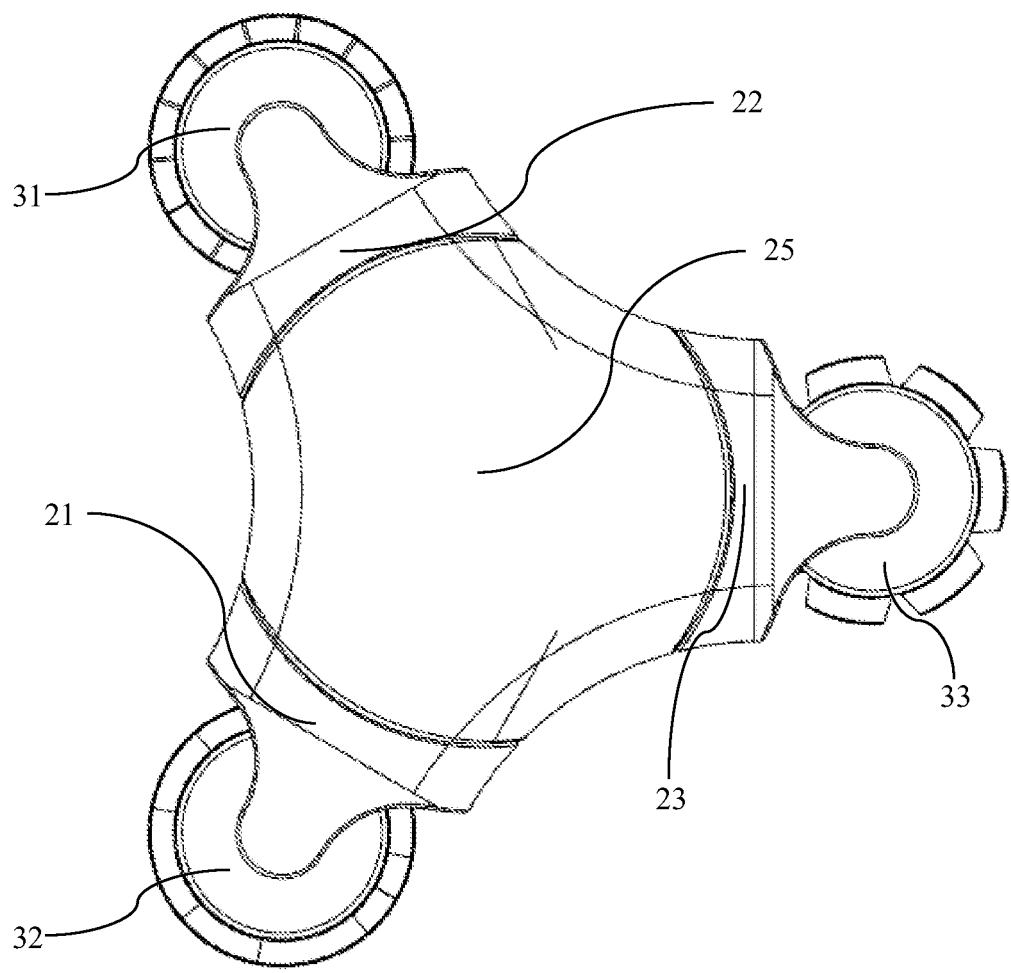
FIG. 2 is a top plan view of the cookie decorating tool of FIG. 1.
Figure 3:
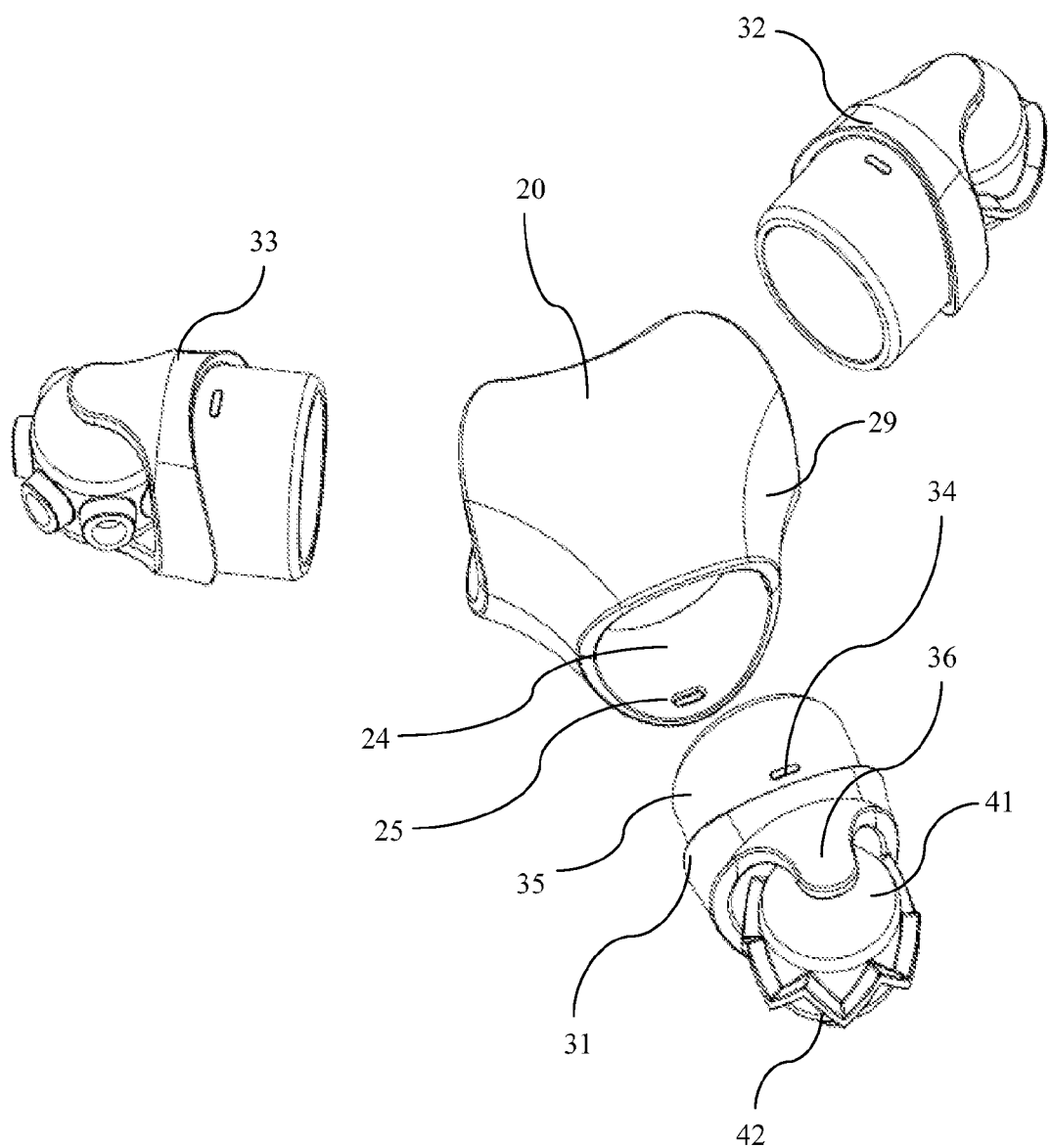
FIG. 3 is an exploded view of the cookie decorating tool of FIG. 1.

In an exemplary version, such as seen in FIG. 2, the main body is formed from a rigid material and includes a central hub 25 with three radial spokes 21, 22, 23. As seen in FIG. 3, the spokes include terminal ends configured to receive a tool head 31, 32, 33 which, in a preferred version, is removable and interchangeable such that any one of the tool heads may be removed and replaced with a different tool head. In the preferred versions of the invention the main body includes connection points for at least two, or more preferably at least three tool heads.

In other versions the main body may be configured to receive only two, or four or more tool heads, thereby being formed with a number of spokes to accommodate each tool head. In addition, the locations on the main tool body for connecting the tool heads need not extend radially away from the tool head as with a hub and spoke; rather, in other versions of the invention the main body may be shaped simply as a hub with a plurality of connection locations configured to receive a tool head. Most preferably, however, each of the tool heads extends at least somewhat beyond the hub to form a surface for grasping the main body and the tool in general.

As seen in FIG. 3, the main body 20 is generally formed (as seen in a top plan view) as a triangle with truncated apexes, each of the sides further being bowed or concave inward somewhat to form a saddle shape along each of the three sides (for example, side 29) that forms a pleasing aesthetic shape. In this preferred version, the main body is formed as a hub with three attachment locations spaced equally about the perimeter and lying in a common plane. A spoke or short arm extends outward from the hub toward the attachment point.

In one example, the main body is hollow and each of the tool head attachment locations also terminates in an opening (for example, opening 24 as seen in FIG. 3) for receiving a tool head (for example, tool head 31). As shown, the opening 24 is substantially circular in cross section, sized and configured to receive a complementary-shaped cylindrical connection end 35 of a tool head 31.

The tool head further includes a raised tab 34 formed on the cylindrical neck of the tool head. The tab is sized and configured to be received by a corresponding slot 25 formed on an interior sidewall of the hollow cylindrical portion of the tool head connection point on the main body. The tab and slot are sized such that they cooperate to hold the tool head to the connection point and main body when in use. Most preferably, at least a pair of tabs is formed on the tool head, and a complementary pair of slots is formed on the main body. Thus, with respect to FIG. 3 the tab 34 visible on the tool head will mate with a slot that is hidden from view on the main body, while an opposing tab (hidden from view) on the tool head will mate with the slot 25 that is visible on the main body. The main body, tool head, or both, are preferably formed from materials allowing for a degree of flexure under stress, sufficient to allow the tool head to be inserted into or removed from the main body upon exertion of a moderate force.

Other forms of connection may be used instead of the particular version described above. For example, the tab and slot arrangement may be reversed, with a tab on the main body and a slot on the tool head. Alternatively, a threaded fastener or other formation of channels for a twisting connection may be used. As yet another alternative, the mating cylinders may simply be formed to provide a tight frictional fit to retain them together. Likewise, the orientation of the tool head insertion into the main body may be reversed, such that a portion of the main body (or spoke or arm) is inserted into a portion of the tool head to join them together.

As illustrated, the main body has three connection locations for three different tool heads in a preferred implementation of the invention. Most preferably, each of the three connection locations on the main body are configured in the same way, such that any one of them can be connected to any one of a plurality of tool heads. In this fashion, the tool heads are interchangeable and the main body can accommodate any three different tool heads at one time (or more than three, in other versions of the invention).

The tool heads may take a variety of forms, and in some versions of the invention as described below they may comprise tool heads for rolling, cutting, or stamping details onto cookie dough. It should be appreciated that the tool heads may likewise be used for other food items other than cookies, and therefore the use of the term "cookie" is not intended to limit the scope of the invention to cookies alone. For example, a particular tool head may be configured to provide a cutting wheel for use in cutting pasta or yet other items.

In one form, as shown in FIG. 3, a tool head 31 includes a wheel 41 pivotally connected to the tool head at a pivot location 36. The wheel includes a design 42, and in the illustrated examples the designs may include (for example) a zig-zag pattern, a series of ovals, or a wave pattern. With the roller tool head attached to the main body and in use, the wheel can be rolled across a section of flattened dough to impress the tool head pattern into the dough.

The tool head rollers may be formed from a variety of materials suitable for use with food. In one version, the patterned portion of the tool head is formed from food grade silicone for its nonstick properties. In other versions, the tool head is formed from plastic, metal, or other materials.

Figure 4:
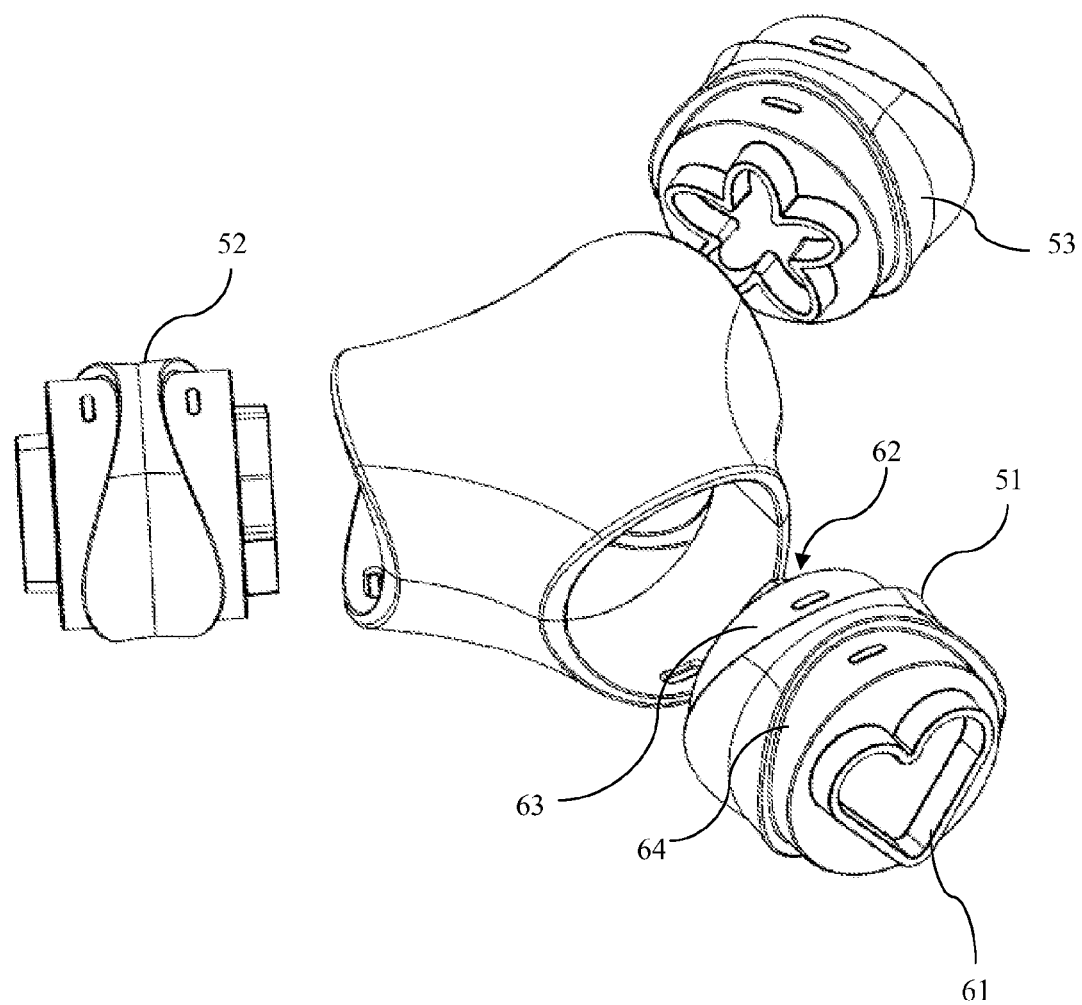
FIG. 4 is an exploded view of an alternate embodiment of a cookie decorating tool, shown with a plurality of stamping tool heads.
Figure 5:
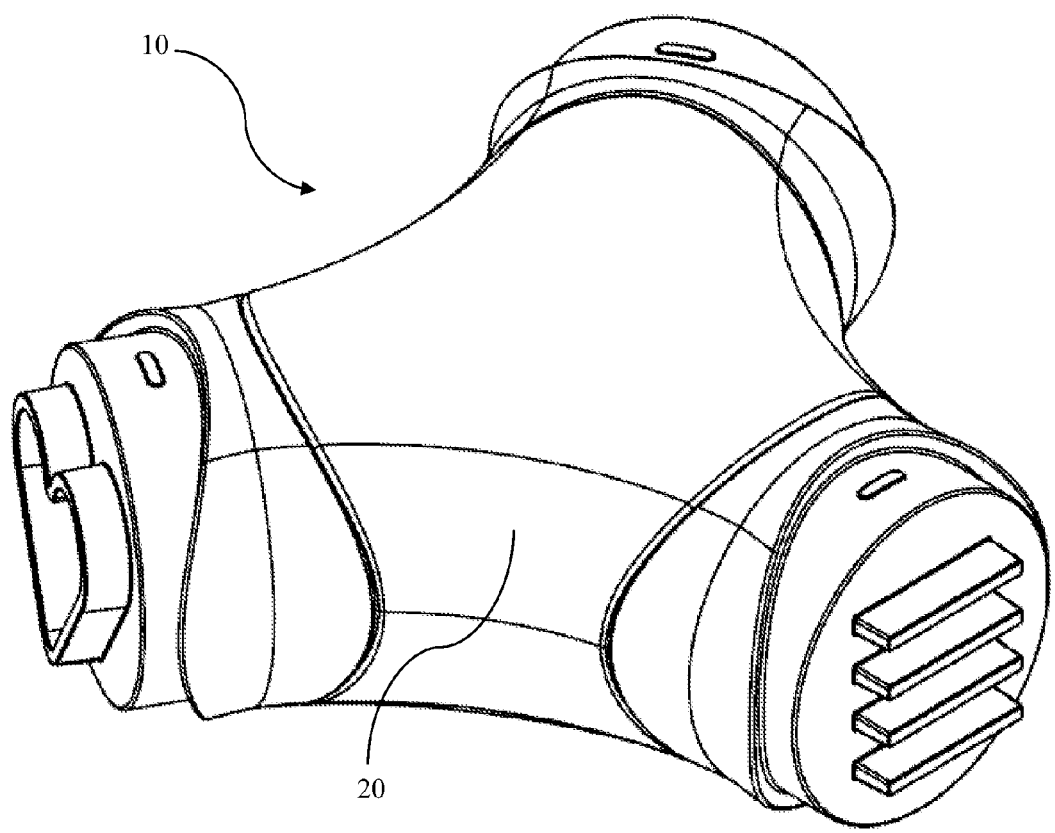
FIG. 5 is a perspective view of the cookie decorating tool of FIG. 4.

In another version, such as illustrated in FIGS. 4 and 5, the tool head is formed as a stamp 51, 52, 53 for use in pressing a design downward into flattened dough. The stamp may be configured to have a stamp design on a first end of the tool head and a connection point on the opposite end. In some versions, the stamp tool head includes a pair of stamps 61, 62, one on each opposing end of the tool head. In an exemplary version of this dual-stamp tool head, the tool head includes a central portion having a first neck 63 on one side and a second neck 64 on the opposite side of the tool head. Each of the necks is sized and configured to be received within the tool head opening for attachment to the tool head, as described above. Thus, in the case of the tool head attachment configuration of the preferred embodiment, each of the first and second necks further includes one or more tabs to be received within a corresponding one or more slots formed in the openings of the tool head connection points.

Each of the necks terminates in a patterned stamp, such as the form of a heart on a first end 61 of the tool head and a different patterned stamp on the opposite second end 62 of the tool head. Other tool heads may incorporate a flower, parallel lines, or other shapes as desired to be stamped into dough. As with the roller tool heads, the stamps may be formed from food grade silicone, plastic, metals, or other materials.

In use, a stamp tool head is attached to the main body, with a desired stamp facing outward. If the stamp tool head is reversible, it may be removed and inverted to use the second stamp head formed on the tool head. In order to impart a stamp design onto the dough, the stamp tool head is pressed downward onto the dough with a desired firmness sufficient to form the desired depth of the design in the dough.

In a version of the invention having three attachment locations, three tool heads may be attached at once. The three tool heads may be three stamps, three rollers, or any mixture of stamps and rollers. Accordingly, the tool heads and main body are preferably configured so that roller tool heads and stamp tool heads can both be selectively secured to any location on the main body. Likewise, in versions in which the main body has additional connection points a corresponding additional number of tool heads may be used.

In yet other versions of the invention, the main body may be formed with tool heads permanently attached. This form of the invention is less desired than the versions as described above, which allow for interchangeability of tool heads and removal for cleaning.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A cookie decorating tool, comprising:
   a main body having a plurality of connection points comprising at least three connection points evenly spaced about a perimeter of the main body; and
   a plurality of decorating tool heads comprising at least three decorating tool heads, including at least one stamping tool head and at least one rolling tool head, each of the plurality of decorating tool heads being removably attached to a separate one of the plurality of connection points, wherein each of the plurality of decorating tool heads is configured to be interchangeably attachable to more than one of the plurality of connection points;
   wherein the plurality of decorating tool heads comprises at least one reversible stamping tool head, the reversible stamping tool head having a first stamp positioned on a first end of the tool head and a second stamp positioned on a second end of the tool head, the reversible stamping tool head being selectively connectable to the main body such that when the first stamp is positioned outside the main body for use the second stamp is positioned within the main body for storage, and when the second stamp is positioned outside the main body for use the first stamp is positioned within the main body for storage.

2. The cookie decorating tool of claim 1, wherein the reversible stamping tool head further comprises a plurality of reversible stamping tool heads, each of the reversible stamping tool heads being selectively attachable to any one of the plurality of connection points.

3. The cookie decorating tool of claim 1, wherein the plurality of decorating tool heads further comprises a plurality of rolling tool heads, each one of the plurality of rolling tool heads being connectable to any one of the plurality of connection points.

4. A cookie decorating tool, comprising:
   a main body having a plurality of connection points positioned about a perimeter of the main body; and
   a plurality of tool heads, comprising:
      at least one stamping tool head removably attached to a first one of the plurality of connection points positioned on the main body; and
      at least one rolling tool head, the rolling tool head having a wheel pivotally attached to the rolling tool head at a pivot location, the rolling tool head being removably attached to a second one of the plurality of connection points positioned on the main body;
      wherein the at least one stamping tool head further comprises at least one reversible stamping tool head, the reversible stamping tool head having a first stamp positioned on a first end of the tool head and a second stamp positioned on a second end of the tool head, the reversible stamping tool head being selectively connectable to the main body such that when the first stamp is positioned outside the main body for use the second stamp is positioned within the main body for storage, and when the second stamp is positioned outside the main body for use the first stamp is positioned within the main body for storage.

5. The cookie decorating tool of claim 4, wherein each of the stamping tool head and the rolling tool head is configured to be removably attachable to more than one connection point among the plurality of connection points.

6. The cookie decorating tool of claim 4, wherein each one of the plurality of tool heads is connectable to any one of the plurality of connection points.

7. The cookie decorating tool of claim 4, further comprising a design formed on the wheel of the rolling tool head.

8. The cookie decorating tool of claim 4, wherein the reversible stamping tool head and the rolling tool head are each removably connectable to any one of the plurality of connection points.

* * * * *